United States Patent [19]

Zalessky et al.

[11] 4,312,239

[45] Jan. 26, 1982

[54] METHOD AND APPARATUS FOR ULTRASONIC MEASUREMENT OF THE RATE OF FLOW

[76] Inventors: Eduard A. Zalessky, ulitsa Tashkentskaya, 130, kv. 11; Vladimir V. Smyshlyaev, ulitsa Michurina, 116, kv. 57, both of Kuibyshev, U.S.S.R.

[21] Appl. No.: 68,472

[22] Filed: Aug. 20, 1979

[51] Int. Cl.³ .......................... G01F 1/66; G01P 5/00
[52] U.S. Cl. ................................................. 73/861.29
[58] Field of Search ........................ 73/861.28, 861.29

[56] References Cited

U.S. PATENT DOCUMENTS 3,678,731 7/1972 Wells et al. ...................... 73/861.29

*Primary Examiner*—Herbert Goldstein
*Attorney, Agent, or Firm*—Steinberg & Raskin

[57] ABSTRACT

A method of ultrasonic measurement of a rate of flow utilizes simultaneous passage of two auto-circulation pulse trains of opposite directions through a single acoustic channel and through the medium under control so that the instants at which the pulses of the trains are brought into coincidence are eliminated. The pulses of one pulse train are used to phase-synchronize a self-excited oscillator whose frequency is a whole number of times the repetition rate of such pulse train. The coincidence instants are eliminated by interrupting the same pulse train before a specific instant of coincidence and restoring it with the help of a pulse produced by the self-excited oscillator. The pulse is held out of coincidence with a pulse of the other pulse train. The rate of flow is the difference between the repetition rates of the pulses of the trains and is determined by comparing the repetition rate of the pulses of the other train with the frequency of the self-excited oscillator.

3 Claims, 21 Drawing Figures

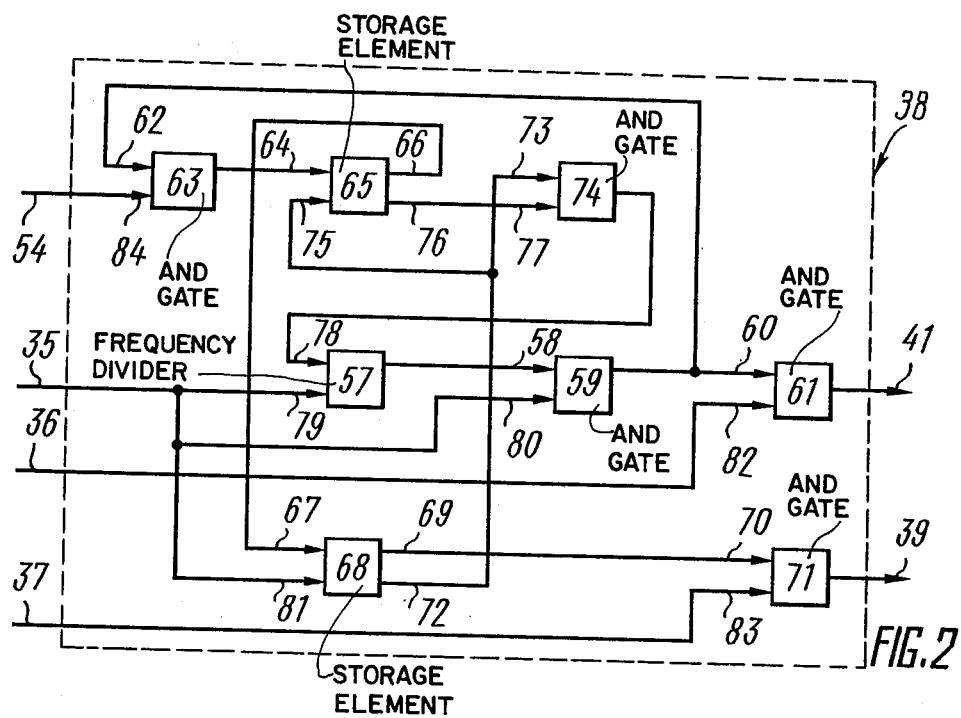
PULSE COINCIDENCE CHECK/CONTROL UNIT

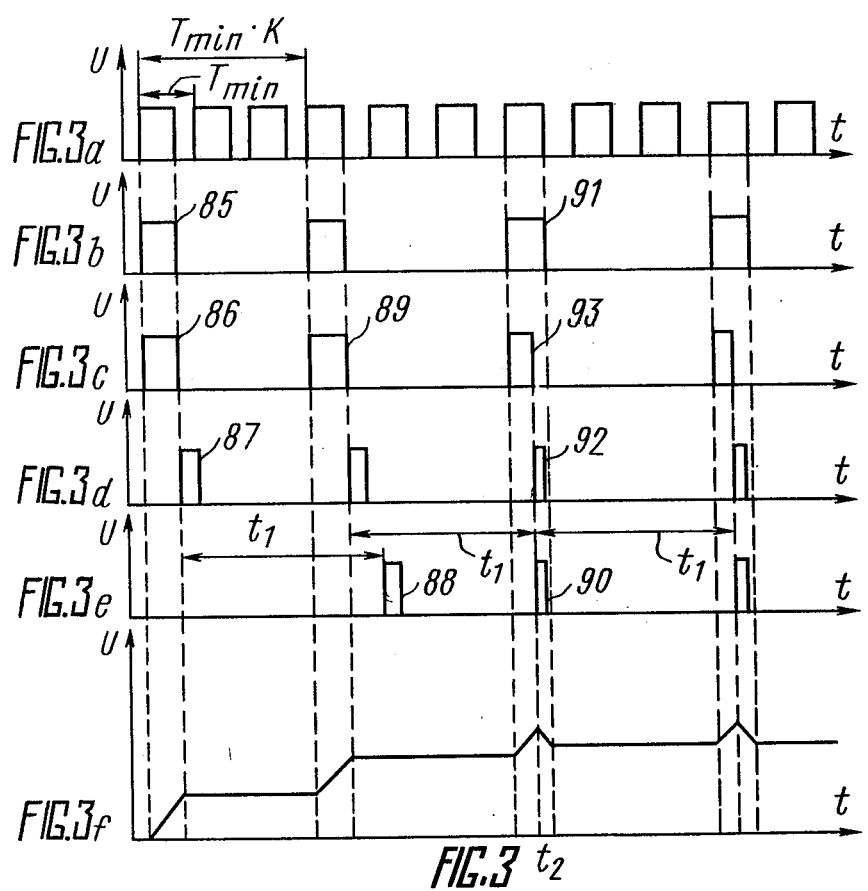

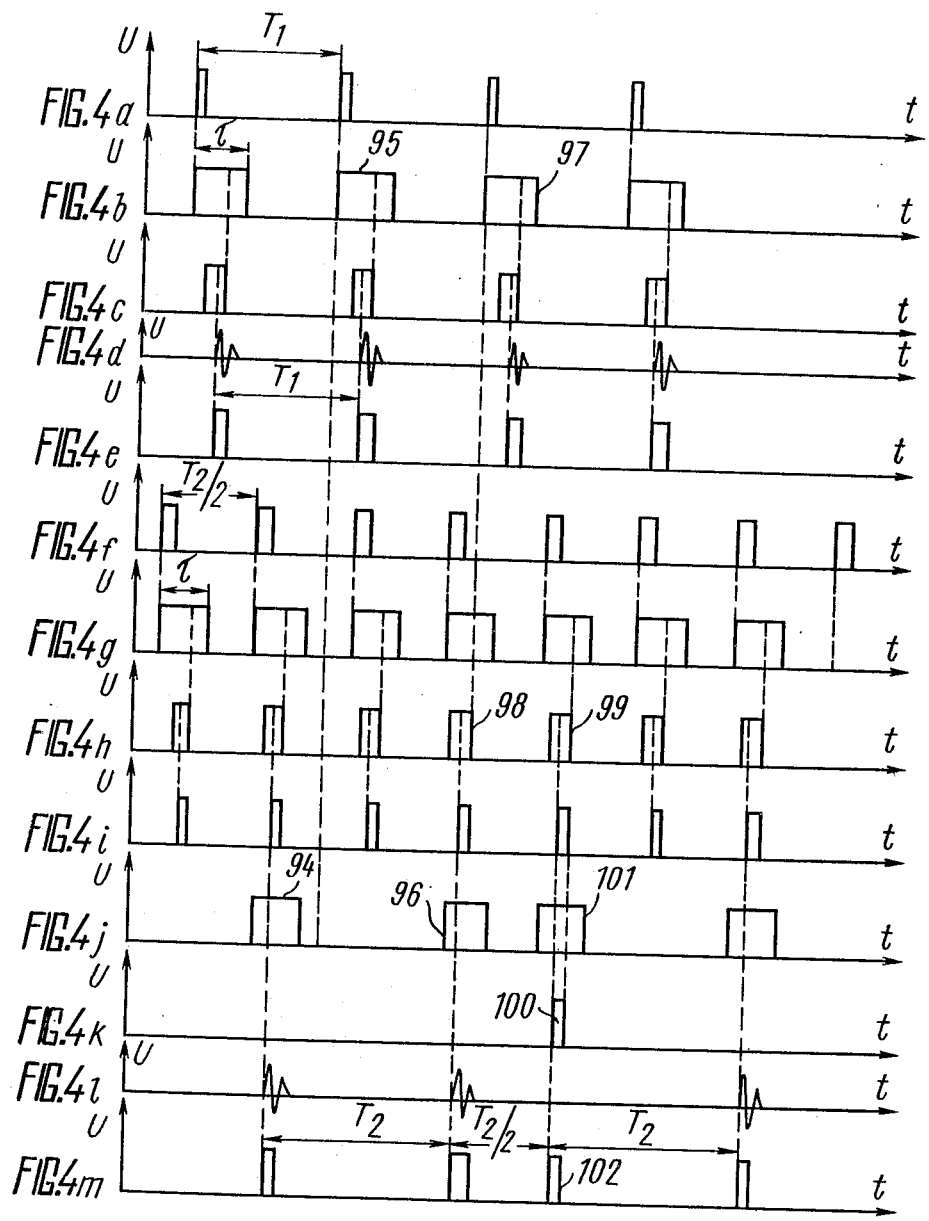

METHOD AND APPARATUS FOR ULTRASONIC MEASUREMENT OF THE RATE OF FLOW

BACKGROUND OF THE INVENTION

The invention relates to the field of ultrasonic measurements, and more particularly to a method and apparatus for ultrasonic measurement of a rate of flow.

The invention is applicable to the measurement of the rate of flow of petrol and its products, chemical products, food products, and water in melioration systems.

The term "flowmeter" as used in this text applies to apparatus designed to measure both the velocity of flow and the rate of flow, since measurements based on acoustic waves deal with the velocity of flow which is a function of the rate of flow.

When a flow running, for example, through a pipeline, is to be measured, it is desirable that its movement is not disturbed during measurement. Another requirement is concerned with the availability of a relatively cheap apparatus which can provide highly accurate measurements and long service life and which cannot be influenced by the temperature and other changes of the physical properties of the medium under control.

Taken as a first approximation are the results provided by ultrasonic frequency-pulse measurement methods in which the influence of the physical properties of the medium under control is eliminated. These methods are realized by ultrasonic flowmeters based on a synchronization ring-like arrangement which constitutes a pulsed generating system with a delayed acoustic feedback. Such an arrangement is operated in a pulse auto-circulation mode.

To measure the rate of flow, use is made of apparatus with one or two acoustic channels, in which an acoustic channel is a space through which it is intended to pass the medium under control and to separate two electro-acoustic transducers.

Known in the art is a method of ultrasonic measurement of the rate of flow, which deals with the passage through the medium under control of two auto-circulation pulse trains which in turn pass through two respective acoustic channels. The pulses in the acoustic channels are in downstream and upstream direction, respectively. The difference between the repetition rates of the pulses of the two pulse trains, may be used to determine the rate of flow.

A known ultrasonic flowmeter designed to carry out the aforedescribed method utilizes two synchronization ring-like arrangements, each of which is provided with a an amplifier-former, a generator producing the arrangement signals, and an excitation pulse former connected in series. The series connections are coupled to two respective electro-acoustic transducers which are separated by a space, through which the medium under control is passed, and having a relative orientation allowing for the transmission and reception acoustic signals passing between them in a direction which makes an angle different from 90° with the direction in which the medium under control moves. The flowmeter also comprises frequency multipliers and a measuring unit (cf. U.S. Pat. No. 3,625,057, Int. Cl. G01P 5/00).

In each of the synchronization ring-like arrangements, the generator pulse is applied to the excitation pulse former, whose output produces a singal which is applied to the respective electroacoustic transducer, which emits a pulse into the medium under control. After the other transducer has received that pulse, said pulse is applied again to the corresponding excitation pulse former and the pulses are subject to an auto-circulation process in the arrangement. The frequency of each ring-like arrangement is multiplied in the corresponding frequency multipliers and the measuring unit is then operated to determine the frequency difference, which is a measure of the rate of flow of the medium under control.

Since two acoustic channels are used in the aforedescribed flowmeter, an extra error occurs due to a difference in the paths covered by the pulses. This difference is not caused by the properties of the medium.

To provide for higher accuracy of measurement, the described flowmeter should be fabricated and assembled with a great degree of precision. The temperature condition of the electronic circuitry and the pipeline section being measured must be held constant within very close limits. The lengths of the acoustic channels must be held constant with an accuracy of several micron units. Finally, the error due to the difference between the paths of the pulses, not caused by the properties of the medium, should be compensated. All of these disadvantages place a limitation on the possible uses of the flowmeter in systems requiring no higher accuracy of measurement.

There is another method of ultrasonic measurement of the rate of flow, which is free from error due to nonidentical condition of the channels. This method comprises the steps of alternate passage through the medium under control and through a single acoustic channel of two auto-circulation pulse trains of opposite directions, storing, for the time of passage of the pulses of one direction, the repetition rate of the pulses propagating in the opposite direction, and determining the rate of flow using the difference between the repetition rates of the two pulse trains.

The flowmeter for realizing the aforedescribed method comprises two electroacoustic transducers, a one-channel measuring circuit based on a synchronization ring-like arrangement with a storage device, and a measuring unit (cf. the USSR Inventor's Certificate No. 191,155, Int. Cl. G01f).

The ring-like arrangement of the flowmeter is operated alternately in the downstream and upstream mode. The storage device is used to store, for the time of passage of the pulses of one direction, the repetition rate of the pulses of the opposite direction. The measuring unit uses the difference between the stored and the present value of the repetition rates of the two auto-circulation pulse trains to indicate the rate of flow.

In this method, alternate passage through the medium under control of two auto-circulation pulse trains of opposite directions results in a condition where ultrasonic waves pass through sections of the medium which have different physical properties which are changed between the switching cycles. This causes an extra error of measurement of the rate of flow. In addition, the method is not applicable to measuring the rate of pulsating flows, since the measurement process has a large time constant. To attain higher accuracy of measurement, the flowmeter must be provided with a re-adjustable storage device which could store the frequency with an error of the order of $10^{-9}$. This is a feature attainable at present with extremely great difficulty.

A method of ultrasonic measurement of the rate of flow known in the art comprises the steps of concurrent passage through the medium under control and through a single acoustic channel of two auto-circulation pulse trains of opposite directions, eliminating the instants at which the pulses of the two pulses train are brought into coincidence, and determining the rate of flow using the difference between the repetition rate of the pulses of the two trains. According to the method, the elimination of the instants when the pulses of the trains are brought into coincidence is attained by relative shifting in time of each of the two pulse trains. The number of these shifts, characteristic in indirect way of the difference between the repetition rates of the pulses of the trains, is a measure of the rate of flow.

The flowmeter for realizing th aforedescribed method comprises two synchronization ring-like arrangements which utilize a single acoustic channel, two units adapted to shift the autocirculation pulse trains, a flip-flop adapted to count the number of shifts, and a frequency meter to measure the repetition rate of the pulses of the flip-flop, which is an indirect measure of the rate of flow (cf. the USSR Inventor's Certificate No. 479,000, Int. Cl. G01F 1/00).

The method is disadvantageous, because the number of shifts of the pulse trains differs from the true value of the difference between the arrangement frequencies, which increases the error of measurement of the rate of flow. In addition, the method requires that the pulse trains be shifted in time in strictly similar manner, since this influences the accuracy with which the rate of flow is measured. However, it is very difficult to meet the last-mentioned requirement.

The described flowmeter described features an intrinsic methodical error of measurement of the rate of flow. In addition, the units designed to shift the pulse trains as well as the elements of the ring-like arrangements are allowed to have a time non-identity of the order of several nanosecond units. This requirement makes the flowmeter barely realizable, so that the advantages of the single-channel method vanish. The flowmeter measures the rate of flow slowly. For example, with the pipeline diameter equal to 1 m and with a flow velocity of 0.1 m/s. the difference between the ring-like arrangements will be about 0.1 Hz, which means that too large a measurement time of 10 s is required. In addition, it is impossible to automatically drive the flowmeter into the auto-circulation mode or to automatically restore its operation after a temporary disturbance of the acoustic channel, which may be caused by ultrasonic scattering relating to gas bubbles or foreign matter in the media under control. This, of course, places certain limitations on its uses in automatic control systems.

There is an ultrasonic flowmeter comprising two synchronization ring-like arrangements which include, respectively, series-connected inhibitors, excitation pulse formers, and electroacoustic transducers and an amplifier-former, all of which are common to the two synchronization ring-like arrangements. The transducers are separated from each other by a space, through which the medium under control is passed, and have a relative orientation allowing for the transmission and reception of acoustic signals passing between them in a direction which makes an angle different from 90° with the direction in which the medium under control moves. The flowmeter comprises trigger pulse units coupled to the corresponding synchronization ring-like arrangements and having, respectively, self-excited oscillators whose inputs are connected to outputs of search/automatic phase control networks, and whose outputs are connected, via corresponding frequency dividers, to inputs of AND gates, to inputs of the search/automatic phase control networks, and to inputs of storage elements whch have their outputs coupled to the other inputs of the search/automatic phase control networks and the AND gates. The flowmeter further comprises a measuring unit common to the two synchronization ring-like arrangements and having its inputs coupled to outputs of the self-excited oscillators (cf. USSR application for U.S. patent, Ser. No. 016,339, filed Feb. 28, 1979 and allowed Apr. 16, 1980 as Pat. No. 4,240,292.

The respective trigger pulse unit operates to drive the corresponding ring-like arrangement into an auto-circulation pulse mode and is then switched off. The trigger pulses are applied again to the ring-like arrangement when the acoustic channel is disturbed due to ultrasonic scattering relating to gas bubbles or foreign matter in the medium under control.

The flowmeter is automatically triggered and restores its operation after an occurrence of a temporary disturbance of the acoustic channel. The flowmeter has high operational speed and good noise immunity.

The disadvantages of the flowmeter are that the two ring-like arrangements can operate steadily in a single acoustic channel in a sequential mode only. This reduces the accuracy of measurement of the rate of flow, since the physical properties of the medium under control tend to vary between the switching cycles. In addition, the frequency of one ring-like arrangement should be stored during operation of the other, which causes an extra measurement error.

SUMMARY OF THE INVENTION

An object of the invention is to provide a method of ultrasonic measurement of a rate of flow, which method is simple to carry out, ensures greater accuracy of measurement of the rate of flow and does not require prolonged storage of the frequency value.

Another object of the invention is to provide an apparatus to carry out a method of ultrasonic measurement of a rate of flow, which apparatus provides good operational reliability and utilizes simple circuitry.

The method of ultrasonic measurement of a rate of flow of the present invention utilizes simultaneous passage of two auto-circulation pulse trains of opposite directions through a single acoustic channel and through the medium under control so that the instants at which the pulses of the trains are brought into coincidence are eliminated and the rate of flow is determined as the difference between the repetition rates of the pulses of the trains. The method of the invention comprises the steps of utilizing the pulses of one of the pulse trains for phase synchronization of a self-excited oscillator whose frequency is a whole number of times the repetition rate of that pulse train, eliminating the instants of coincidence by interrupting the same pulse train before a specific instant of coincidence and restoring it with the help of a pulse produced by the self-excited oscillator, said pulse being held out of coincidence with a pulse of the other pulse train, and determining the difference between the repetition rates of the pulses of the trains by comparing the repetition rate of the pulses of the other train with the frequency of the self-excited oscillator.

The apparatus of the invention for carrying out the method of ultrasonic measurement of a rate of flow comprises two synchronization ring-like arrangements which include, respectively, series-connected inhibitors, excitation pulse formers, and electroacoustic transducers and an amplifier-former, all of which are common to the two synchronization ring-like arrangements. The transducers are separated from each other by a space, through which the medium under control is passed, and have a relative orientation allowing for the transmission and reception of acoustic signals passing between them in a direction which makes an angle different from 90° with the direction in which the medium under control moves. The apparatus further comprises trigger pulse units coupled to the corresponding synchronization ring-like arrangements and having, respectively, adjustable self-excited oscillators whose inputs are connected to outputs of search/automatic phase control networks and whose outputs are connected, via corresponding frequency dividers, to inputs of AND gates, to inputs of the search/automatic phase control networks, and to inputs of storage elements which have their outputs coupled to the other inputs of the search/automatic phase control networks and the AND gates. The apparatus further comprises a measuring unit common to the synchronization ring-like arrangements and having its inputs coupled to outputs of the self-excited oscillators. In accordance with the invention, the trigger pulse units are provided with working pulse formers. A respective one of the working pulse formers is coupled in series between the output of the corresponding frequency divider and a common point used to join together respective inputs of the corresponding AND gate, storage element and search/automatic phase control network other working pulse former has its input coupled to the output of the other frequency divider and its outputs coupled to respective inputs of a pulse coincidence check/control unit which checks for the coincidence of the pulses generated by the ring-like arrangements and controls the instants at which the ring-like arrangements receive blocking and unblocking pulses. The check/control unit has an input coupled to an output of the first working pulse former, an output coupled to an input of the second excitation pulse former, and another output coupled to another common point used to join together respective inputs of the second AND gate, search/automatic phase control network and storage element.

Thus, the apparatus of the invention for ultrasonic measurement of a rate of flow, comprises a first synchronization ring-like arrangement including first and second electroacoustic transducers spaced from each other by a space through which a medium under control is passed, the first and second transducers being positioned to provide a relative orientation which permits the transmission and reception of acoustic signals passing between them in a direction making an angle different from 90° with the direction of movement of the medium under control. The first synchronization ring-like arrangement comprises a first inhibitor having a first input, a second input and an output, a first excitation pulse former having a first input connected to the output of the first inhibitor, a second input, a third input and an output, the first electroacoustic transducer being connected to the output of the first excitation pulse former, and an amplifier-former having a first input connected to the second electroacoustic transducer, a second input and an output connected to the first input of the first inhibitor. A second synchronization ring-like arrangement includes the first and second electroacoustic transducers, and the amplifier-former, and comprises a second inhibitor having a first input, a second input and an output and a second excitation pulse former having a first input connected to the output of the second inhibitor, a second input, and an output connected to the second electroacoustic transducer, the first electroacoustic transducer being connected to the second input of the amplifier-former and the output of the amplifier-former being connected to the first input of the second inhibitor. A first trigger pulse unit connected to the first synchronization ring-like arrangement comprises a first storage element having a first input connected to the output of the second inhibitor, a second input and an output, a first search/automatic phase control network having a first input connected to the output of the first storage element, a second input and an output, a first adjustable self-excited oscillator having an input connected to the output of the first search/automatic phase control network and an output, a first frequency divider having an input connected to the output of the first self-excited oscillator and an output, a first working pulse former having an input connected to the output of the first frequency divider, a first output connected to the second input of the first storage element and to the second input of the first search/automatic phase control network and a second output, and a first AND gate having a first input connected to the first output of the first working pulse former, a second input connected to the output of the first storage element and an output connected to the second input of the second inhibitor and to the second input of the second excitation pulse former. A second trigger pulse unit connected to the second synchronization ring-like arrangement and the first trigger pulse unit comprises a second storage element having a first input connected to the output of the first inhibitor, a second input and an output, a second search/automatic phase control network having a first input connected to the output of the second storage element, a second input and an output, a second adjustable self-excited oscillator having an input connected to the output of the second search/automatic phase control network and an output, a second frequency divider having an input coupled to the output of the second self-excited oscillator and an output, a second working pulse former having an input connected to the output of the second frequency divider, a first output, a second output and a third output, a pulse coincidence check/control unit for checking the coincidence of pulses generated by said first and second ring-like arrangements and controlling the instants at which the ring-like arrangements receive blocking and unblocking pulses, the check/control unit having a first input connected to the first output of the second working pulse former, a second input connected to the second output of the second working pulse former, a third input connected to the third output of the second working pulse former, a fourth input connected to the second output of the first working pulse former, a first output connected to the second input of the second storage element and the second input of the second search/automatic phase control network and a second output connected to the second input of the first excitation pulse former, and a second AND gate having a first input connected to the first output of the check/control unit, a second input connected to the output of the second storage element and an output connected to the third input of the first working pulse former and to the second input of the first inhibitor. A measuring unit connected to the first and second trigger pulse units has a first input connected to the output of the first self-excited oscillator and a second input connected to the output of the second self-excited oscillator. The check-/control unit preferably comprises a frequency divider having its output coupled to an input of a first AND gate which has its output coupled to an input of a second AND gate and to an input of a third AND gate. The third AND gate has its output coupled to an input of a first storage element which has an output coupled to a data input of a second storage element. The second storage element has its output coupled to an input of a fourth AND gate and has another output coupled to an input of a fifth AND gate and to the other input of the first storage element. The first storage element has another output coupled to the other input of the fifth AND gate. The output of the fifth AND gate is coupled to a set input of the frequency divider. The other input of the frequency divider, joined together with the other input of the first AND gate and coupled to a clock input of the second storage element as well as the other input of the second AND gate and the other input of the fourth AND gate, constitute respective inputs of the check/control unit. The other input of the third AND gate is used as another input of the check/control unit. The outputs of the fourth and second AND gates, respectively, are used as the first and second outputs of the check/control unit.

The method of the invention, as compared to the prior art methods, provides for higher accuracy of measurement of the rate of flow and does not require a prolonged frequency storage. The apparatus of the invention is simple to carry out using commercially available measuring units. It has a means for automatically triggering and restoring the operation of the ring-like arrangements and offers good operational reliability.

BRIEF DESCRIPTION OF THE DRAWINGS

The invention will now be described in more detail, by way of example, with reference to the accompanying drawings, in which:

FIG. 2 is a block diagram of an embodiment of the pulse coincidence check/control unit of the invention for checking the coincidence of the pulses generated by the ring-like arrangements and controlling the instants at which the ring-like arrangements of the apparatus receive blocking and unblocking pulses;

FIGS. 3a, 3b, 3c, 3d, 3e and 3f are illustrating the operation of one of the ring-like arrangements of the apparatus of FIG. 1 in the triggering mode, in accordance with the invention; and FIGS. 4a, 4b, 4c, 4d, 4e, 4f, 4g, 4h, 4j, 4k, 4l and 4m are voltage diagrams illustrating the operation of the apparatus of FIG. 1 in the measuring mode.

DESCRIPTION OF PREFERRED EMBODIMENTS

Figure 1:
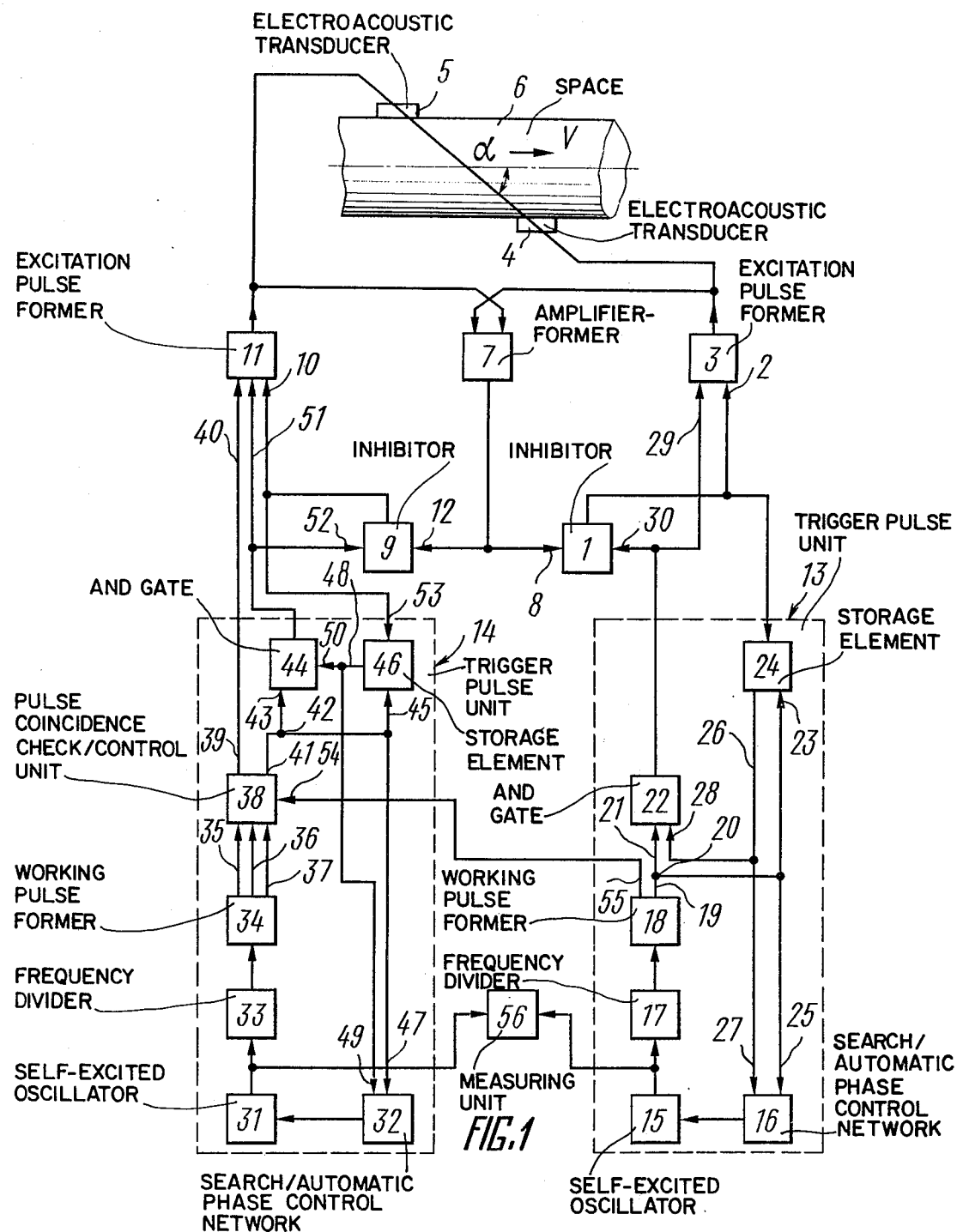
FIG. 1 is a block diagram of an embodiment of the apparatus of the invention for ultrasonic measurement of a rate of flow.

The method of the invention comprises the following steps. Two auto-circulation pulse trains of opposite direction are passed through the medium under control and through a single acoustic channel. The pulses of one of the pulse trains hereinafter referred to as the slave pulse train, are utilized for phase synchronization of the self-excited oscillator, which provides for complete data of the slave pulse train. The self-excited oscillator frequency is a whole number of times the frequency of the slave pulse train. The other pulse train propagating in the opposite direction, hereinafter referred to as the master pulse train, is a continuous pulse train. The instants at which the pulses of the master and slave pulse trains are brought into coincidence are eliminated by interrupting the slave pulse train before the instant of coincidence and restoring it with the help of a pulse produced by the self-excited oscillator and held out of coincidence with a pulse of the master pulse train. Since the slave pulse train is restored with phase accuracy, the synchronization of the self-excited oscillator by the restored pulse train does not cause a transient to occur. This means that the self-excited oscillator provides data on the continuous, or quasi-continuous, operation of the slave pulse train. The difference between the repetition rates of the pulses of both pulse trains, which is a measure of the rate of flow, is determined by comparing the repetition rate of the master pulse train with the self-excited oscillator frequency.

The apparatus of the invention used to measure the rate of flow is shown in FIG. 1. It comprises two synchronization ring-like arrangements. The first synchronization ring-like arrangement, hereinafter referred to as the master synchronization ring-like arrangement, includes an inhibitor 1 (FIG. 1) coupled to an input 2 of an excitation pulse former 3, electroacoustic transducers 4, 5 separated from each other by a space 6 through which the medium under control is passed, and an amplifier-former 7 which is coupled to an input 8 of the inhibitor 1.

The second synchronization ring-like arrangement, hereinafter referred to as the slave synchronization ring-like arrangement, includes an inhibitor 9 coupled to an input 10 of an excitation pulse former 11, the electroacoustic transducers 5, 4 separated by the space 6 through which the medium under control is passed, and the amplifier-former 7 which is coupled to an input 12 of an inhibitor 9.

The transducers 4 and 5 are mounted at opposite sides of the pipeline and are oriented with respect to each other so as to allow for the transmission and reception of acoustic signals passing between them. The angle $\alpha$ between the direction of the velocity V in the pipeline and the direction in which acoustic waves pass between the transducers 4, 5 is made different from 90°.

The apparatus of the invention also comprises trigger pulse units 13 and 14 which are coupled, respectively, to the master and slave ring-like arrangements. The trigger pulse unit 13 comprises an adjustable self-excited oscillator 15 whose input is coupled to the output of a search/automatic phase control network 16. The output of the self-excited oscillator 15 is coupled, via a frequency divider 17, to the input of a working pulse former 18 whose output 19 is coupled to a common point 20 which is used to join together an input 21 of an AND gate 22, an input 23 of a storage element 24 and an input 25 of the search/automatic phase control network 16. An output 26 of the storage element 24 is coupled to an input 27 of the search/automatic phase control network 16 and to an input 28 of the AND gate 22 which has its output coupled to a trigger input 29 of the excitation pulse former 3 and to a control input 30 of the inhibitor 1. The output of the inhibitor 1 is coupled to an input of the storage element 24.

The trigger pulse unit 14 comprises a self-excited oscillator 31 having its input coupled to the output of a search/automatic phase control network 32. The output of the self-excited oscillator 31 is coupled, via a frequency divider 33, to the input of a working pulse former 34 whose outputs 35, 36, 37 connect to a pulse coincidence check/control unit 38, which checks for the coincidence of the pulses generated by the ring-like arrangements and controls the instants at which the ring-like arrangements receive blocking and unblocking pulses. An output 39 of the check/control unit 38 is coupled to a trigger input 40 of the excitation pulse former 11, while an output 41 is coupled to a common point 42 used to join together an input 43 of an AND gate 44, an input 45 of a storage element 46 and an input 47 of the search/automatic phase control network 32. An output 48 of the storage element 46 is coupled to an input 49 of the search/automatic phase control network 32 and to an input 50 of the AND gate 44 whose output is coupled to a trigger input 51 of the excitation pulse former 11 and to a control input 52 of the inhibitor 9. The inhibitor 9 has an output coupled to an input 53 of the storage element 46. An input 54 of the check/control unit 38 is coupled to an output 55 of the working pulse former 18. The outputs of the self-excited oscillators 15 and 31 are coupled to respective inputs of a measuring unit 56.

FIG. 2 shows an embodiment of the check/control unit 38. The check/control unit 38 comprises a frequency divider 57 having its output coupled to an input 58 of an AND gate 59 which has its output coupled to an input 60 of an AND gate 61 and to an input 62 of an AND gate 63. The AND gate 63 has its output coupled to a set input 64 of a storage element 65 having its output 66 coupled to a data input 67 of a storage element 68 whose output 69 is coupled to an input 70 of an AND gate 71. A complement output 72 of the storage element 68 is coupled to an input 73 of an AND gate 74 and to an erase input 75 of the storage element 65 whose complement output 76 is coupled to an input 77 of the AND gate 74. The output of the AND gate 74 is coupled to a set input 78 of the frequency divider 57. An input 79 of the frequency divider 57 is coupled to an input 80 of the AND gate 59 and to a clock input 81 of the storage element 68. The input 79, an input 82 of the AND gate 61 and an input 83 of the AND gate 71 constitute, respectively, inputs 35, 36, 37 of the check/control unit 38. The outputs of the AND gates 71 and 61 constitute outputs 39 and 41, respectively, of the check/control unit 38.

AND-NOT gates may be used, as the inhibitors 1 and 9 (FIG. 1). The storage elements 24 and 26 (FIG. 1) and the storage elements 65 (FIG. 2) may be R-S flip-flops. The frequency divider 57 may be a D flip-flop with a set input, while a clock-type D flip-flop may be used as the storage element 68.

Each of the search/automatic phase control networks 16 and 32 (FIG. 1) is an element having a discharger such as, for example, a capacitor.

The measuring unit 56 comprises a frequency changer and an indicator.

The method of the invention is carried out by the corresponding apparatus whose operation according to two modes, triggering and measuring, is hereinafter described.

In the triggering mode, the voltage from the search/automatic phase control network 16 is applied to the input of the self-excited oscillator 15 with the result that its frequency is changed. When the supply voltages are applied, the voltage across the output of the search/automatic phase control network 16 is equal to zero. The repetition cycle of the pulses produced by the self-excited oscillator 15 is minimal and is equal to $T_{min}$ (FIG. 3a). In addition, a condition that the repetition cycle $T_{min}$ K of the pulses from the output of the frequency divider 17 having a division factor K is less than a minimal time in which the signal is propagated through the acoustic channel, must be satisfied. The period T of the adjustable self-excited oscillator 15 is so selected that the maximum repetition cycle of the pulses at the output of the frequency divider 17, $T_{max}$, exceeds the maximum time required for the passage of the signal through the acoustic channel. Thus, the following conditions are to be satisfied.

$$T_{min} \cdot K < \frac{L}{C_{max} + V_{max}^1}, \quad (1)$$

where
L is the distance covered by the acoustic waves passing in the medium under control between the electroacoustic transducers,
$C_{max}$ is the maximum velocity of propagation of ultrasonic waves in the medium under control, which depends on the medium properties and surroundings, and
$V_{max}^1$ is the projection of the vector of the maximum possible velocity in the medium, as referred to the direction of the acoustic wave beam.

$$T_{max} \cdot K < \frac{1}{C_{min} - V_{max}^1} \quad (2)$$

where $C_{min}$ is the minimum velocity of propagation of ultrasonic waves in the medium under control, which depends on the medium properties and surroundings.

At the moment when supply voltages are applied there is no pulse at the output of the adjustable self-excited oscillator 15 and, therefore, no pulses are present at the outputs of the frequency divider 17 and the working pulse former 18. A low level is then present at the output 19 of the working pulse former 18.

The low level is worked out in the storage element 24 whose output 26 produces a high level. In the initial state, the inhibitor 1 produces a high level. Since the output 26 of the storage element 24 is coupled to the input 28 of the AND gate 22, a first positive pulse 85 (FIG. 3b) from the output 19 of the working pulse former 18 is applied to the input 21 of the AND gate 22 and the pulse 86 (FIG. 3c) is applied to the input 30 of the inhibitor 1, so that the said inhibitor is made conductive, and to the input 29 of the excitation pulse former 3 which is thus triggered by the trailing edge of the positive pulse 86.

The pulse 87 (FIG. 3d) from the excitation pulse former 3 is applied to the electroacoustic transducer 4 and is converted therein to an ultrasonic signal which is passed through the medium under control and is accepted by the electroacoustic transducer 5 which converts that signal into an electrical one. The electrical signal passes to the amplifier-former 7, which produces a square pulse 88 (FIG. 3e) after amplification and this pulse is applied to the input 8 of the inhibitor 1. The pulse 88 at the output of the amplifier-former 7 is delayed relative to the pulse 88 from the output of the excitation pulse former 3 by a time interval $t_1$. Since the period of pulses from the output 19 of the working pulse former 18 is minimal and is less than $t_1$, the next pulse 89 (FIG. 3c) from the output of the AND gate 22 is applied to the input 30 of the inhibitor 1 some time before the pulse from the output of the amplifier-former 7 arrives at the input 8 of the inhibitor 1. At the moment of arrival of the pulse 88 from the amplifier-former 7, the inhibitor 1 is made non-conductive. In spite of this, the pulse 89 from the output of the AND gate 22 passes through the acoustic channel in a manner analogous to that for the first pulse, and so on.

At the same time, the positive pulses from the output 19 of the working pulse former 18 are applied to the input 25 of the search/automatic phase control network 16 so that its output voltage is increased (FIG. 3f). The period of the adjustable self-excited oscillator 15 is increased until the inhibitor 1 becomes conducting by means of the pulse 91 (FIG. 3b) obtainable from the output 19 of the working pulse former 18. This occurs at the moment when the pulse 90 (FIG. 3e) from the amplifier-former 7 is applied to the inhibitor 1. After that, the pulse 90 from the amplifier-former 7 passes to the input 2 of the excitation pulse former 3 and triggers it by the leading edge. As a result, the master synchronization ring-like arrangement is activated (sync pulse 92 in FIG. 3d). At the same time, a negative pulse from the output of the inhibitor 1 is applied to the input of the storage element 24, so that the output 26 of said storage element accepts a low level. Thus, the AND gate 22 receives an inhibit pulse, with the result that the length of the pulse 93 (FIG. 3c) at its output is limited per the point in time $t_2$ in FIGS. 3a to 3f. The trailing edge of the positive pulse at the output of the AND gate 22 then coincides with the leading edge of the negative pulse at the output of the inhibitor 1. This means that further operation of the oscillator 15 does not influence the operation of the master synchronization ring-like arrangement. As a result, the oscillator 15 is automatically switched off and the master arrangement is then operated in a continuous mode.

The search/automatic phase control network 16 is then switched from the search mode to the automatic phase control mode in which the phase of the oscillator 15 is adjusted with respect to the auto-circulation pulses of the master synchronization ring-like arrangement. A high level at the output 26 of the storage element 24 is set again by the trailing edge of the positive pulse 91 from the output 19 of the working pulse former 18. The pulses from the output 19 of the working pulse former 18 are applied to the input 25 of the search/automatic phase control network 16, whose other input 27 receives pulses from the output 26 of the storage element 24. The leading edge of these pulses is held in coincidence with the leading edge of the master arrangement pulse passed through the inhibitor 1. The search/automatic phase control network 16 operates to detect an error characteristic of a time mismatch between the pulse from the output 19 of the working pulse former 18 and the leading edge of the auto-circulation pulse available from the master arrangement, and converts that error to a control signal used to control the frequency and phase of the oscillator 15. This adjustment is performed in a manner whereby the leading edge of the auto-circulation pulse from the master arrangement is held within the pulse from the output 19 of the working pulse former 18, preferably in the middle of such pulse. Thus, the inhibitor 1 and, therefore, the master arrangement are made conductive by the leading edge of the pulse from the output 19 of the working pulse former 18 and assume their non-conductive state according to the leading edge of the pulse from the master arrangement. This means that the time within which the master arrangement is conducting is half the length of the pulse from the output 19 of the working pulse former 18. To provide for better noise immunity, the length of the pulse from the output 19 is selected equal to 1 to 2% of the repetition cycle of the auto-circulation pulses.

When the electroacoustic channel is disturbed, the pulses from the output 19 of the working pulse former 18 continue to pass to the input 25 of the network 16 so that its voltage output is increased. In this case, the repetition cycle of the pulses at the output 19 thus increases. At a maximal voltage at the output of the network 16, that repetition cycle reaches a maximum and the network 16 causes a discharge from the maximal voltage to zero. Thereafter, the apparatus commences an operational cycle analogous to that hereinbefore described.

The slave arrangement is triggered by the trigger pulse unit in a similar way.

Therefore, the pulses from the outputs of the oscillators 15 and 31 are related in terms of frequency and phase to the pulses of the master and slave arrangements, respectively, but their frequencies exceed the repetition rates of the corresponding arrangement pulses in accordance with the division factors of the frequency dividers 17 and 33, respectively.

In the measuring mode, the master and slave arrangements of the apparatus of the invention are driven into auto-circulation and the following voltage diagrams are for the outputs of certain units. FIG. 4a shows the pulses at the output of the frequency divider 17 of the trigger pulse unit 13 of the master arrangement. The repetition cycle of these pulses is equal to the repetition cycle $T_1$ of the pulses of the master arrangement. FIG. 4b shows the pulses at the output 55 of the working pulse unit 18. These pulses are referred to as the master arrangement inhibit pulses, herein. They are necessary for the instants at which the pulses from the master and slave arrangements are eliminated. These pulses are further described in detail, hereinafter. FIG. 4c shows the pulses at the output 19 of the working pulse former 18. FIG. 4d shows the pulses delivered from the master arrangement to the transducer 5. FIG. 4e shows the pulses at the output of the excitation pulse former 3. Referring to FIGS. 4d and 4e, the master arrangement operates in a continuous mode and has a period $T_1$.

The division factor of the frequency divider 33 is selected so that the repetition rate at its output (FIG. 4f) is a whole number of times that of the pulses of the slave arrangement. This is two times in FIG. 4f. The working pulse former 34 of the trigger pulse unit 14 of the slave arrangement is used to form, from the pulses obtainable from the output of the frequency divider 33, the master arrangement inhibit pulses (FIG. 4g) which are applied to the input 35 of the check/control unit 38 and also the pulses (FIG. 4h) applied to the input 36 of said check/control unit. These two trains represent, respectively, the master arrangement inhibit pulses and the pulses at the output 19 of the working pulse former 18.

Since a fixed coupling is established, in terms of frequency and phase, between the oscillators 15 and 31 and the train pulses available from the respective ring-like arrangements, a condition in which the inhibit pulses involve the signals received by the electroacoustic transducers 4 and 5 may be easily maintained.

In addition, a fixed coupling between the oscillator 31 and the pulses of the slave arrangement, in terms of frequency and phase, permits the working pulse former 34 to form the pulses (FIG. 4i) applied to the input 37 of the check/control unit 38, the leading edges of these pulses being held in coincidence with the leading edges of the pulses of the slave arrangement. The pulses of the slave arrangement are the pulses at the output of the excitation pulse 11 (FIG. 4i) hereinafter referred to as the stored phase pulses.

Since the repetition rate of the pulses from the output of the frequency divider 33 is a whole number of times that of the pulses from the slave arrangement, the working pulse former 34 produces the train pulses representing the inhibit pulses (FIG. 4g), the stored phase pulses (FIG. 4i) and the pulses applied to the input 36 (FIG. 4h) of the check/control unit 38. The repetition rate of the pulses applied to the input 36 is a whole number of times that of the pulses of the slave arrangement. This is times in the given example. Thus, each of the pulse trains formed may be considered as one obtained in superposing two pulse trains, an even one and an odd one, having their frequencies equal to the frequency of the slave arrangement, but phase-shifted relative to each other by a value equal to the half-period of the slave arrangement. Due to the available phase adjustment, the edges of the stored phase pulses, belonging, for example, to an even pulse train, coincide with the edges of the pulses provided by the excitation pulse former 11 and therefore are maintained in synchronism with the pulses of the slave arrangement. The inhibit pulses for the even train involve the signal received by the transducer 4. Only the pulses belonging to the even pulse train are applied from the output 41 of the check/control unit 38 to the AND gate 44, the storage element 46 and the search/automatic phase control network 32.

During the passage of the measured flow through the pipeline section under control there is a frequency difference between the master and slave arrangements and their signals tend to gradually approach each other. To eliminate the instant at which these signals would coincide with each other, the master attachment is given a priority by the check/control unit 38 and is thus operated in a continuous mode. In addition, the check/control unit 38 checks for the coincidence of the even pulse train inhibit pulses (pulse 94 in FIG. 4j) with the inhibit pulses from the working pulse former 18 (pulse 95 in FIG. 4b).

After such a coincidence has occurred, wherein pulse 96 of FIG. 4j coincides with pulse 97 of FIG. 4b, the check/control unit 38 works out a half-period phase shift for the autocirculation pulses of the slave arrangement. To accomplish this, the check/control unit 38 stops to pass the even train pulses to the input 43 of the AND gate 44 (pulse 98 of FIG. 4h) and begins to pass the odd train pulses (pulse 99 of FIG. 4h). The odd pulse train is shifted by a half-period relative to the even pulse train. The inhibitor 9 does not pass the slave arrangement pulses belonging to even pulse trains, but does pass such pulses belonging to odd pulse trains.

At the same time, the check/control unit 38 passes from the output 39 a stored phase pulse 100 (FIG. 4k) belonging to an odd pulse train, which pulse is applied to the input 40 of the excitation pulse former 11 and restores the operation of the slave arrangement with a half-period shift. Further pulse adjustment applies to odd pulses.

The check/control unit 38 begins to check for the coincidence of the master arrangement inhibit pulses with the slave arrangement inhibit pulses in the case of an odd pulse train (pulse 101 in FIG. 4j). When the arrangement signals tend to approach each other again, a half-period phase shift of the auto-circulation pulses occurs in the master arrangement, and so on.

FIG. 4l shows the slave arrangement signals received by the transducer 4, whereas FIG. 4d shows the master arrangement signals received by the transducer 5. As shown in these Figs., the signals are not brought into coincidence. To provide for normal operation of the apparatus, the length $\tau$ of the inhibit pulses is given by $$2\tau < \frac{T}{N} \qquad (3)$$

where

T is the minimal repetition cycle of the arrangement pulses, and

N is the ratio of the frequency of pulses at the output of the frequency divider 33 to the frequency of pulses of the slave arrangements.

With N=2 in the given example, the value of $\tau$ is given by $$2\tau < \frac{T}{2} \qquad (4)$$

Referring to FIG. 4m, which contains the pulses provided by the excitation pulse former 11, the slave arrangement restores its operation after a half-period (pulse 102 in FIG. 4m). At greater values of N, the restoration time can be decreased and the minimal value of $\tau$ is selected in this case on the basis of the parameters of the acoustic transducers 4 and 5.

FIGS. 4f, 4g, 4h, and 4i show continuous pulse trains, since they are obtained from the pulses of the self-excited oscillator 31 which is phase-related to the pulses of the slave arrangement. By comparing the repetition rate of the pulses of the oscillator 31 and the repetition rate of the pulses of the master arrangement, data on the rate of flow may be obtained. To obtain a unitary scale, the data of the arrangement pulse frequencies is preferably taken from the self-excited oscillators 15 and 31. The measuring unit 56 will then provide continuous data on the velocity of flow according to the following relation $$\Delta f = n \frac{V}{D} \sin 2\alpha, \qquad (5)$$

where $\Delta f$ is the difference between the frequencies of the self-excited oscillators 15 and 31, D is the diameter of the measured pipeline, n is the division factor of the frequency dividers 17 and 33, into which the value of a scale factor is introduced, and V is the velocity of the medium under control.

For the apparatus of the invention shown in FIG. 1, n=100.

The check/control unit 38 is described in detail as follows.

The master arrangement inhibit pulses (FIG. 4g), having a frequency which exceeds by a factor of 2 the frequency of this arrangement, are passed from the input 35 of the check/control unit 38 to the input 79 of the frequency divider 57 and to the input 80 of the AND gate 59. Since the input 58 of the AND gate 59 is coupled to the output of the frequency divider 57, the output of the AND gate 59 will produce every second inhibit pulse for the slave arrangement such as, for example, an even pulse train. The repetition rate of these pulses is equal to that of the pulses of the slave arrangement and they are applied to the input 60 of the AND gate 61. The pulses (FIG. 4h) from the input 36 of the check/control unit 38 are applied to the input 82 of the AND gate 61. The repetition rate of these pulses is two times the frequency of the slave arrangement. Since these pulses are within the inhibit pulses, the output of said AND gate 61 will produce every second pulse from those applied to the input 82 of said AND gate, and the pulses so selected are delivered to the output 41 of the check/control unit 38. The pulses from the output of the AND gate 59 are also applied to the input 62 of the AND gate 63 whose input 84 receives the master arrangement inhibit pulses (FIG. 4b) from the input 54 of the check/control unit 38. When the arrangement inhibit pulses do not coincide in the AND gate 63, a low level is present at the output 66 of the storage element 65 and is delivered to the data input 67 of the storage element 68. As a result, a low level is always held at the output 69 of the storage element 68. That low level blocks the AND gate 71 through the input 70 and the stored phase pulses applied to the input 83 of the AND gate 71 from the input 37 of the check/control unit 38 do not pass to the output 39 of the check/control unit 38.

When the arrangement inhibit pulses 96 and 97 are brought into coincidence in the AND gate 63, the output of said AND gate produces a pulse applied to the set input 64 of the storage element 65, whose output 66 thus accepts a high level. That high level is delivered to the data input 67 of the storage element 68 which is made ready for writing data acknowledging the coincidence of the inhibit pulses. The data is placed in the storage element 68, using the leading edge of the slave arrangement inhibit pulse 101 (FIG. 4j) which is applied to the clock input 81 of said storage element from the input 35 of the check/control unit 38. To restore the operation of the slave arrangement, the store phase pulse 102 (FIG. 4m) is passed from the input 37 of the check/control unit 38 via the AND gate 71.

At the instant that the arrangement inhibit pulses are brought into coincidence, a low level from the output 76 of the storage element 65 is delivered via the AND gate 74 to the set input 78 of the storage element 57, whose output accepts a low level, too. The output of the AND gate 59 then stops producing even inhibit pulses for the slave arrangement. According to the leading edge of the pulse 101 (FIG. 4j), a low level from the output 72 of the storage element 68 is applied to the erase input 75 of the storage element 65. In the storage element 65, data of the arrangement inhibit pulses coincidence is erased and the data input 67 of the storage element 68 accepts a low level again. The pulse then present from the input 35 of the check/control unit 38 causes the storage element 68 to assume the other state. This, in turn, makes the AND gate 71 non-conductive through the input 70 and the AND gate 74 becomes conductive through the input 73. A low level is removed from the set input 78 of the storage element 57 and the output of the AND gate 59 again produces inhibit pulses shifted by half-period and representing, therefore, the pulses of an odd pulse train, and so on.

What is claimed is:

1. A method of ultrasonic measurement of a rate of flow of a medium under control, said method utilizing a single acoustic channel and a self-excited oscillator having a selected frequency, said method comprising the steps of
simultaneously passing first and second auto-circulation pulse trains in opposite directions through the medium under control and through a single acoustic channel;
phase synchronizing the self-excited oscillator via the pulses of said first pulse train, the frequency of said oscillator being a whole number of times the repetition rate of said first pulse train;
interrupting said first pulse train before an instant at which the pulses of said first and second pulse trains coincide;
holding a pulse from said oscillator out of coincidence with a pulse of said second pulse train in order to eliminate the instants of coincidence;
restoring said first pulse train via said pulse from said oscillator;
comparing the repetition rate of the pulses of said second pulse train with the frequency of said oscillator in order to determine the difference between the repetition rates of the pulses of said pulse trains; and
determining the rate of flow of said medium by utilizing the difference between the repetition rates of the pulses of said pulse trains.

2. Apparatus for ultrasonic measurement of a rate of flow, comprising
a first synchronization ring-like arrangement including first and second electroacoustic transducers spaced from each other by a space through which a medium under control is passed, said first and second transducers being positioned to provide a relative orientation which permits the transmission and reception of acoustic signals passing between them in a direction making an angle different from 90° with the direction of movement of the medium under control, said first synchronization ring-like arrangement comprising a first inhibitor having a first input, a second input and an output, a first excitation pulse former having a first input connected to the output of said first inhibitor, a second input, a third input and an output, said first electroacoustic transducer being connected to the output of the first excitation pulse former, and an amplifier-former having a first input connected to the second electroacoustic transducer, a second input and an output connected to the first input of said first inhibitor;
a second synchronization ring-like arrangement including said first and second electroacoustic transducers, and said amplifier-former, said second synchronization ring-like arrangement comprising a second inhibitor having a first input, a second input and an output, and a second excitation pulse former having a first input connected to the output of said second inhibitor, a second input, and an output connected to said second electroacoustic transducer, said first electroacoustic transducer being connected to the second input of said amplifier-former and the output of said amplifier-former being connected to the first input of said second inhibitor;
a first trigger pulse unit connected to said first synchronization ring-like arrangement, said first trigger pulse unit comprising a first storage element having a first input connected to the output of said second inhibitor, a second input and an output, a first search/automatic phase control network having a first input connected to the output of said first storage element, a second input and an output, a first adjustable self-excited oscillator having an input connected to the output of said first search/automatic phase control network and an output, a first frequency divider having an input connected to the output of the first self-excited oscillator and an output, a first working pulse former having an input connected to the output of the first frequency divider, a first output connected to the second input of said first storage element and to the second input of said first search/automatic phase control network and a second output, and a first AND gate having a first input connected to the first output of said first working pulse former, a second input connected to the output of said first storage element and an output connected to the second input of said second inhibitor and to the second input of said second excitation pulse former;

a second trigger pulse unit connected to said second synchronization ring-like arrangement and said first trigger pulse unit, said second trigger pulse unit comprising a second storage element having a first input connected to the output of said first inhibitor, a second input and an output, a second search/automatic phase control network having a first input connected to the output of said second storage element, a second input and an output, a second adjustable self-excited oscillator having an input connected to the output of said search/automatic phase control network and an output, a second frequency divider having an input coupled to the output of said second self-excited oscillator and an output, a second working pulse former having an input connected to the output of said second frequency divider, a first output, a second output and a third output, a pulse coincidence check/control unit for checking the coincidence of pulses generated by said first and second ring-like arrangements and controlling the instants at which said ring-like arrangements receive blocking and unblocking pulses, said check/control unit having a first input connected to the first output of said second working pulse former, a second input connected to the second output of said second working pulse former, a third input connected to the third output of said second working pulse former, a fourth input connected to the second output of said first working pulse former, a first output connected to the second input of said second storage element and the second input of said second search/automatic phase control network and a second output connected to the second input of said first excitation pulse former, and a second AND gate having a first input connected to the first output of said check/control unit, a second input connected to the output of said second storage element and an output connected to the third input of said first working pulse former and to the second input of said first inhibitor; and a measuring unit connected to said first and second trigger pulse units, said measuring unit having a first input connected to the output of said first self-excited oscillator and a second input connected to the output of said second self-excited oscillator.

3. Apparatus as claimed in claim 2, wherein said pulse coincidence check/control unit comprises a third frequency divider having a first input which is the first input of said check/control unit, a second input and an output, a third AND gate having a first input connected to the output of said third frequency divider, a second input and an output, a fourth AND gate having a first input connected to the output of said third AND gate, a second input which is the second input of said check/control unit and an output which is the first output of said check/control unit, a fifth AND gate having a first input connected to the output of said third AND gate, a second input which is the fourth input of said check/control unit and an output, a third storage element having a first input connected to the output of said fifth AND gate, a second input, a first output and a second output, a fourth storage element having a first input connected to the first output of said third storage element, a second input connected to the first input of said third frequency divider and the second input of said third AND gate, a first output and a second output, a sixth AND gate having a first input connected to the first output of said fourth storage element, a second input which is the third input of said check/control unit and an output which is the second output of said check/control unit, a seventh AND gate having a first input connected to the second output of said third storage element, a second input connected to the second input of said third storage element and connected to the second output of said fourth storage element, and an output connected to the second input of said third frequency divider.

* * * * *